April 12, 1927.  R. B. BAGBY  1,624,573
PASTEURIZING APPARATUS
Filed Aug. 31, 1926
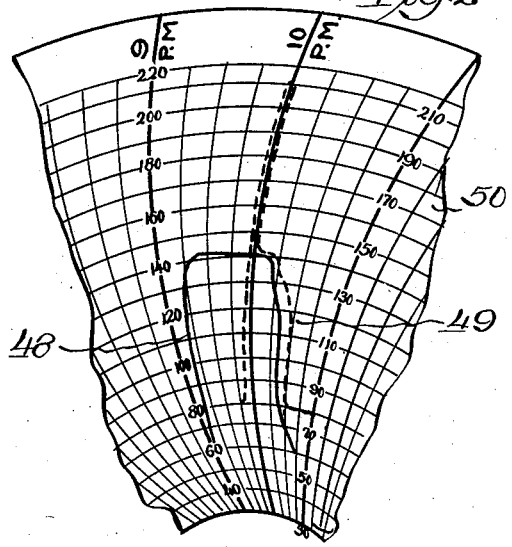
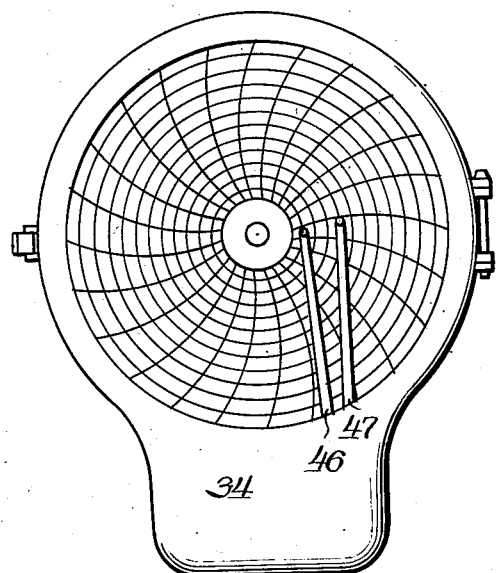
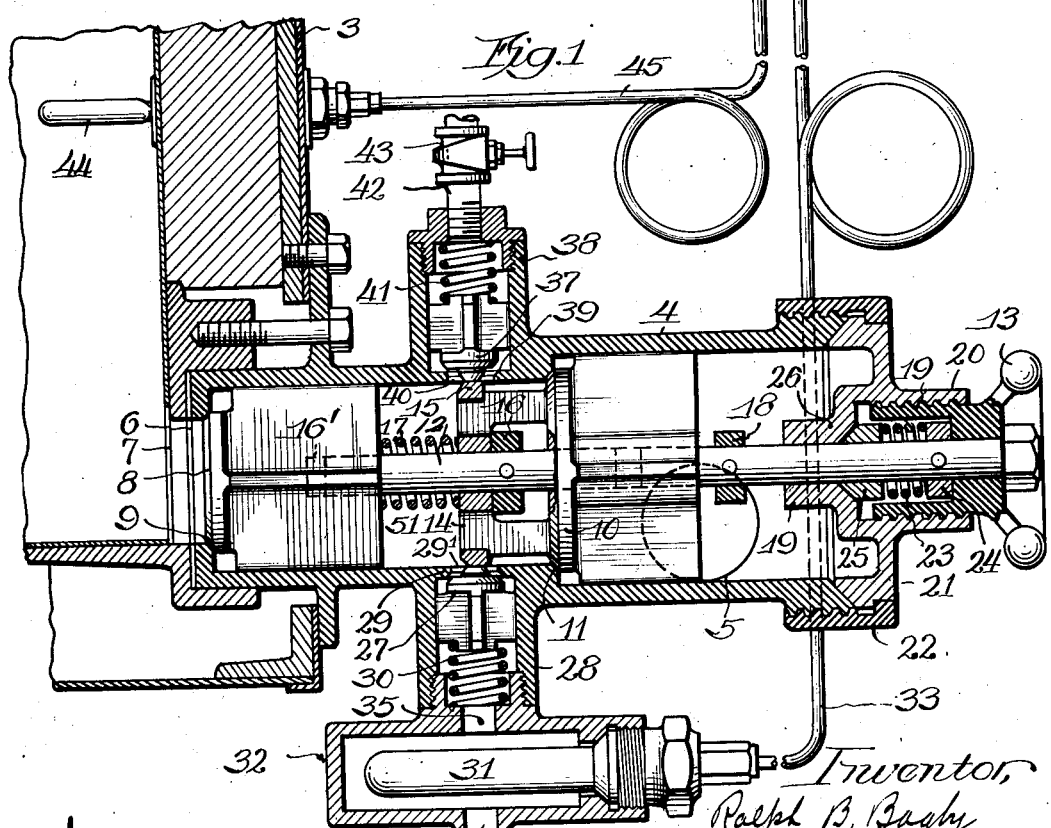
Inventor,
Ralph B. Bagby
By Wm. O. Bell Atty.
Witness:
Chas. R. Koursh Patented Apr. 12, 1927.

1,624,573

UNITED STATES PATENT OFFICE.

RALPH B. BAGBY, OF CEDAR RAPIDS, IOWA, ASSIGNOR TO J. G. CHERRY COMPANY, OF CEDAR RAPIDS, IOWA, A CORPORATION OF IOWA.

PASTEURIZING APPARATUS.

Application filed August 31, 1926. Serial No. 132,880.

This invention relates to apparatus for Pasteurizing milk and including a Pasteurizing tank, a pipe line connected with the tank to receive Pasteurized milk therefrom, and valve devices in the connection whereby the tank outlet and the pipe line inlet are opened and closed conjointly.

In Pasteurizing milk by the batch method it is customary, according to present requirements, to hold the milk in a Pasteurizer or container for thirty minutes at a temperature approximately 145°. The outlet valve for a Pasteurizer is operated intermittently and it is difficult and practically impossible to prevent some leakage. If this leakage is permitted to collect in the connection with the pipe line it will contaminate the Pasteurized milk flowing from the tank when the outlet valve is opened.

One object of this invention is to prevent leakage from the Pasteurizing tank from contaminating Pasteurized milk discharged from the tank by providing means for disposing of such leakage and for sterilizing the connection between the Pasteurizer tank and the pipe line preliminary to discharging the Pasteurized milk from the tank into the pipe line.

More specifically this object is to trap leakage of milk through the valve outlet of the Pasteurizing tank during the Pasteurizing process and to permit it to escape from the connection before it reaches the pipe line valve, and to provide means for sterilizing the trap in the connection between the tank and the pipe line before permitting the Pasteurized milk to flow from the Pasteurizing tank so that the Pasteurized milk will not be contaminated by any un-Pasteurized milk that may have leaked by the outlet valve during the Pasteurizing process and remained in the connection between the tank and the pipe line or adhering to any of the parts therein.

Another object of the invention is to automatically make a time and temperature record of the Pasteurizing operation and of the sterilizing operation of the connection between the tank and the pipe line preliminary to discharging the Pasteurized pipe from the tank into the milk line whereby a record may be preserved upon the condition of the milk and as a check upon the operator to insure proper attention to his duties.

A further object of the invention is to provide a drip-leak in the connection between the Pasteurizer tank and the pipe line, which remains open to dispose of leakage from the tank while the tank outlet valve and the pipe line valve are closed, and thermal means for maintaining a record of the temperature of liquid escaping through the drip leak so that the condition of the tank outlet valve may be constantly observed.

And a further object of the invention is to provide a connection between a Pasteurizing tank and a milk line having direct line operating means for conjointly closing and opening the tank valve and the pipe line valve and means whereby leakage through the tank valve may escape before passing to the pipe line valve while said valves are closed, other means whereby the chamber between said valves and all the parts exposed therein may be sterilized before the tank valve is opened, and means for making a permanent time and temperature record indicating the operation of said valves and sterilizing means.

In the accompanying drawings I have shown a selected embodiment of the invention and referring thereto:

Fig. 1 is a sectional elevation of the invention as it appears in actual use.

Fig. 2 is a detail view showing a specimen record.

Referring to the drawings 3 is a Pasteurizer tank which is connected by a casing 4 with the pipe line 5. The casing has an opening 6 at one end which registers with the outlet 7 from the Pasteurizing tank and a valve disk 8 engages a seat 9 around said opening. A valve disk 10 engages a seat 11 in the casing between the Pasteurizer tank and the pipe line. The valve 8 may be referred to as the tank outlet valve and the valve 10 may be referred to as the pipe line valve since the former controls the outflow of Pasteurized milk from the tank and the latter controls the flow of this Pasteurized milk to the pipe line. These two valves, 8 and 10, are mounted on the same stem 12 which project through the end of the casing and is operated by a hand wheel 13 to move the valves simultaneously and open and close communication between the tank and the pipe line. A yoke 14 is made integral or otherwise rigid with the valve 10 and is provided with a ring cam 15. The valve 10 is loose on the stem and a collar 16 is pinned to the stem within the yoke to engage the yoke on the inward movement of the stem and the valve 10 on the outward movement of the stem. The valve 8 is bored at 16' to receive the end of the stem on which the valve is loosely mounted. A spring 17 is interposed between the valve 8 and the yoke 14 to compensate for any irregularities of fit between the valves. A collar 18 is pinned to the stem to engage the shoulder 19 and form a stop limiting the outward movement of the stem. The handle 13 has a projection 19 which is threaded in the boss 20 on the cap 21 which is secured to the casing by a union 22. This projection is recessed to accommodate a spring 23 arranged on the stem between a collar 24 pinned to the stem and a collar 25 seated against the contracted inner end 26 of the cap.

A drip-leak valve disk 27 is arranged in a tubular extension 28 of the casing to engage a seat 29 around an opening 29' in the casing. This valve is normally urged to its seat by a spring 30. A thermal bulb 31 is arranged in a casing 32 which is mounted on the extension 28 and this bulb is connected by a tube 33 with a recorder 34. An opening 35 forms a connection between the tubular extension 27 and the casing 32 and the latter is provided with an opening 36 to permit the escape of milk which may pass from the casing 4 into the extension 27 and casing 32. I prefer to arrange the termal bulb in horizontal position below the opening 35 so that milk leakage will drop direct upon the thermal bulb.

A steam valve disk 37 is arranged in a tubular extension 38 from the casing to engage a seat 39 around an opening 40 in the casing. This valve is normally urged to its seat by a spring 41 in the extension and a steam pipe 42 is connected to the extension and to a source of supply and is provided with a shut-off valve 43.

A thermal bulb 44 is arranged within the tank and is connected by tube 45 with the recorder 34. This recorder has two pens one of which, 46, is connected with the bulb 44 and the other, 47, is connected with the bulb 31 so that the pen 46 may mark the solid line 48 and the pin 47 may mark the broken line 49 on the chart 50.

In practice the hand wheel 13 is operated to move the stem inward and seat the tank outlet valve 8 and the pipe line valve 10. The collar 16 engages the yoke to move the valve 10 to its seat and the spring 17 operates to seat the valve 8. At the same time the cam 15 engages and unseats the drip leak valve disk 27 and the steam valve disk 37. The tank having received a supply of milk the Pasteurizing process may begin. The pen 46 marks the line 48 to indicate the time and temperature of the Pasteurizing process. Any milk that may leak from the tank around the valve disk 8 and into the casing 4 will drain out of the casing into the extension 28 through the opening 35 upon the thermal bulb 31 and through the opening 36. If there is a substantial leak the pen 47 will indicate it by the mark which it makes upon the chart 50. The two pens 46 and 47 will preferably mark in different colored inks so that the markings will be readily distinguishable. It is difficult to prevent some leakage around the valve disk 8 but ordinarily the leakage is not material in quantity but any leakage of un-Pasteurized milk is objectionable if this leakage is permitted to mix with the Pasteurized milk. Any usual leakage will escape from the casing through the opening 29', the valve disk 29 remaining unseated while the valve disk 8 remains seated; and since the opening 29 is spaced from the pipe line valve disk 10, leakage will escape from the casing before it has an opportunity to reach the pipe line valve. When the Pasteurizing process is completed and before the Pasteurized milk is permitted to flow to the pipe line, the steam valve 43 is opened to admit steam around the valve disk 37, which is now unseated by the cam, to sterilize the chamber 51 in the casing and all the parts therein, condensation of this steam escaping through the drip-leak valve and the opening 36. This condensation drops upon the thermal bulb 31 and the time and temperature thereof is indicated by the pen 47 which marks the line 49. Then the steam valve 43 is closed and the hand wheel 13 is turned to move the stem outward. The spring 17 unseats the valve 10 and at the same time moves the cam 15 away from the valve disks 27 and 37 so that the drip-leak valve and the steam valve will both be closed at or about the same time that the pipe line valve is opened. As the tension on spring 17 releases with the outward movement of the stem the tank outlet valve is opened to permit the Pasteurized milk to flow through the casing into the pipe line. The parts are timed so that the tank outlet valve will not open until the steam valve and the drip-leak valve are closed and the pipe line valve is opened. The pen markings on the chart provide an accurate and permanent record as to time and temperature of the Pasteurizing process and leakage through the outlet valve from the Pasteurizing tank and the sterilizing process to show what leakage is taking place and whether or not the operator is properly attending to his duty to sterilize the parts and avoid contamination by this leakage.

This invention presents many novel and important advantages in this art where much effort and expense are devoted to supplying Pasteurized milk. It is contended that a drop or less of raw milk may contain enough bacteria to contaminate all the milk with which it mixes. I not only provide for trapping leakage from the Pasteurizer tank before it enters the pipe line, and for the escape of this leakage from the casing during Pasteurization, but I also provide for thorough sterilization of the chamber which receives this leakage and through which the Pasteurized milk must flow to the pipe line, and this includes complete Pasteurization of all of the parts within the chamber with which the raw milk leakage may contact; so that when the Pasteurization process is completed and the Pasteurized milk is permitted to flow to the pipe line it will flow through a casing connection not only free from un-Pasteurized milk but thoroughly sterilized, and this insures that the Pasteurized milk will not be contaminated by any leakage that has occurred or by any other unfavorable condition that may have developed in the casing connection between the Pasteurizing tank and the pipe line. Not only does my invention insure this result when it is practiced as it should be but a telltale record is preserved showing, with relation to the sterilizing process, whether the leakage has been normal or excessive, and whether or not and when the sterilizing operation has been performed. The record indicates the Pasteurizing process in time and temperature, and the sterilizing process in time and temperature with relation to the Pasteurizing process so that it can always be determined by reference to the chart whether or not the invention has been practiced as intended to be and the conditions of the two processes with relation to each other.

I claim:

1. The combination of a Pasteurizing tank having an outlet, a pipe line, a connection between said outlet and said pipe line comprising a casing, valves in said casing for said outlet and said pipe line, a drip-leak for the casing between said valves and comprising a valve, and movable means within the casing connecting the outlet valve and the pipe line valve for opening and closing said valves conjointly and for opening and closing the drip-leak valve.

2. The combination of a Pasteurizing tank having an outlet, a pipe line, a connection between said outlet and said pipe line comprising a casing, valves in said casing for said outlet and said pipe line, a stem connecting said valves for conjoint operation, a drip-leak for the casing between said valves and comprising a valve, and means within the casing movable with the stem for opening and closing the drip-leak valve.

3. The combination of a Pasteurizing tank having an outlet, a pipe line, a connection between said outlet and said pipe line comprising a casing, valves in said casing for said outlet and said pipe line, the wall of the casing having a drip-leak opening between said valves, a valve for opening and closing said drip-leak opening, operating means within the casing for opening and closing said outlet valve and said pipe line valve conjointly, and means movable with said operating means for opening and closing the drip-leak valve.

4. The combination of a Pasteurizing tank having an outlet, a pipe line, a connection between said outlet and said pipe line comprising a casing, valves in said casing for said outlet and said pipe line, a drip-leak for the casing between said valves and comprising a valve, movable means within the casing connecting the outlet valve and the pipe line valve for opening and closing said valves conjointly, and other means operating with said movable means for opening and closing the drip-leak valve.

5. The combination of a Pasteurizing tank having an outlet, a pipe line, a connection between said outlet and said pipe line comprising a casing, valves in said casing for said outlet and said pipe line, a drip-leak for the casing between said valves and comprising a valve, movable means within the casing connecting the outlet valve and the pipe line valve for opening and closing said valves conjointly, and a cam within the casing operated by said movable means for opening and closing the drip-leak valve.

6. The combination of a Pasteurizing tank having an outlet, a pipe line, a connection between said outlet and said pipe line comprising a casing, valves in said casing for said outlet and said pipe line, said casing having a drip-leak opening between said valves, a valve for said opening, movable means within the casing for opening and closing the drip-leak valve, and other means within the casing for opening and closing the outlet valve and the pipe line valve and movable conjointly with and independently of the means for opening and closing the drip-leak valve.

7. The combination of a Pasteurizing tank having an outlet, a pipe line, a connection between said outlet and said pipe line comprising a casing, valves in said casing for said outlet and said pipe line, said casing having a drip-leak opening between said valves, a valve for said opening, a cam movable in the casing for opening and closing the drip-leak valve, and means for opening and closing the outlet valve and the pipe line valve and for operating the cam to open and close the drip-leak valve.

8. The combination of a Pasteurizing tank having an outlet, a pipe line, a connection between said outlet and said pipe line comprising a casing, valves in said casing for said outlet and said pipe line, a stem for operating said valves conjointly, a drip-leak for the casing between said valves and comprising a valve, a cam loosely mounted on the stem for opening and closing the drip-leak valve, and means on the stem for operating said cam.

9. The combination of a Pasteurizing tank having an outlet, a pipe line, a connection between said outlet and said pipe line comprising a casing, valves in said casing for said outlet and said pipe line, the chamber in the casing between the tank outlet valve and the pipe line valve comprising a trap to receive leakage from the tank, a drip-leak for the casing between said valves and comprising a valve, means for admitting steam to said chamber to sterilize the chamber and the parts therein while the tank outlet valve and the pipe line valve are closed and the drip-leak valve is open, means for opening and closing the tank outlet valve and the pipe line valve, and means for opening and closing the drip-leak valve and the steam valve.

10. The combination of a Pasteurizing tank having an outlet, a pipe line, a connection between said outlet and said pipe line comprising a casing, valves in said casing for said outlet and said pipe line, a drip-leak for the casing between said valves, a steam line connection to said casing between said valves, there being an opening in the casing communicating with said connection, a valve for said opening, and means within the casing for opening and closing all of said valves.

11. The combination of a Pasteurizing tank having an outlet, a pipe line, a connection between said outlet and said pipe line comprising a casing, valves in said casing for said outlet and said pipe line, a drip-leak for the casing between said valves and comprising a valve, a steam line connection to said casing between said valves, there being an opening in the casing communicating with said connection, a valve for said opening, movable means within the casing connecting the outlet valve and the pipe line valve for opening and closing said valves conjointly, and other means operated by said movable means for opening and closing the drip-leak valve and the steam valve.

12. The combination of a Pasteurizing tank having an outlet, a pipe line, a connection between said outlet and said pipe line comprising a casing, valves in said casing for said outlet and said pipe line, a stem in the casing for operating said valves, a spring on the stem operatively engaged with the outlet valve for enabling relative movement of the stem and the outlet valve, a drip leak for the casing between said valves and comprising a valve, and means within the casing movable with the stem for opening and closing the drip leak valve.

13. The combination of a Pasteurizing tank having an outlet, a pipe line, a connection between said outlet and said pipe line comprising a casing, valves in said casing for said outlet and said pipe line, a drip leak for the casing between said valves and comprising a valve, means for opening and closing said valves, and thermal recording means connected to the casing for indicating leakage into the casing.

14. The combination of a Pasteurizing tank having an outlet, a pipe line, a connection between said outlet and said pipe line comprising a casing, valves in said casing for said outlet and said pipe line, a drip leak for the casing between said valves and comprising a valve, means for opening and closing said valves, and thermal recording means connected to the drip leak for indicating leakage therethrough.

15. The combination of a Pasteurizing tank having an outlet, a pipe line, a connection between said outlet and said pipe line comprising a casing, valves in said casing for said outlet and said pipe line, a drip leak for the casing between said valves and comprising a valve, means for opening and closing said valves, means for sterilizing the casing, and thermal recording means connected to the tank and to the casing for recording the Pasteurizing process and sterilizing process in their time relation to each other.

16. The combination of a Pasteurizing tank having an outlet, a pipe line, a connection between said outlet and said pipe line comprising a casing, valves in said casing for said outlet and said pipe line, a drip leak for the casing between said valves and comprising a valve, means for opening and closing said valves, means for supplying steam to the casing to sterilize the casing, and thermal recording means connected to the tank and to the casing for recording the Pasteurizing process and the sterilizing process in their time relation to each other on a single chart.

RALPH B. BAGBY.